(12) United States Patent
Brinkmeyer

(10) Patent No.: US 10,866,319 B2
(45) Date of Patent: Dec. 15, 2020

(54) STRAY-LIGHT TOLERANT LIDAR MEASUREMENT SYSTEM AND STRAY-LIGHT TOLERANT LIDAR MEASUREMENT METHOD

(71) Applicant: Ernst Brinkmeyer, Buchholz (DE)

(72) Inventor: Ernst Brinkmeyer, Buchholz (DE)

(*) Notice: Subject to any disclaimer, the term of this patent is extended or adjusted under 35 U.S.C. 154(b) by 362 days.

(21) Appl. No.: 15/565,003

(22) PCT Filed: Mar. 11, 2016

(86) PCT No.: PCT/DE2016/100110
§ 371 (c)(1),
(2) Date: Oct. 6, 2017

(87) PCT Pub. No.: WO2016/162010
PCT Pub. Date: Oct. 13, 2016

(65) Prior Publication Data
US 2018/0100924 A1 Apr. 12, 2018

(30) Foreign Application Priority Data
Apr. 7, 2015 (DE) .................. 10 2015 004 272

(51) Int. Cl.
*G01S 17/58* (2006.01)
*G01S 17/95* (2006.01)
(Continued)

(52) U.S. Cl.
CPC ............ *G01S 17/58* (2013.01); *G01S 7/4818* (2013.01); *G01S 7/493* (2013.01); *G01S 7/4917* (2013.01);
(Continued)

(58) Field of Classification Search
None
See application file for complete search history.

(56) References Cited

U.S. PATENT DOCUMENTS 6,297,878 B1 * 10/2001 Miller ...................... G01P 5/26
356/141.1
6,320,272 B1 * 11/2001 Lading .................. F03D 7/0224
290/44
(Continued)

FOREIGN PATENT DOCUMENTS

DE         199 03 301 A1     8/2000
DE    10 2013 002 683 A1     8/2014
(Continued)

OTHER PUBLICATIONS

Xu, "Homodyne In-Phase and Quadrature Detection of Weak Coherent States With Carrier Phase Tracking" (Year: 2009).*
(Continued)

*Primary Examiner* — Isam A Alsomiri
*Assistant Examiner* — Amir J Askarian
(74) *Attorney, Agent, or Firm* — Christensen, Fonder, Dandi & Herbert PLLC

(57) ABSTRACT

A stray-light tolerant LIDAR measurement system. The system comprises an interferometer assembly having a continuous-wave laser source, a photodetection arrangement and optical components. The laser source comprises a laser-light-generating component, a downstream optical phase modulator and a control unit connected to the modulator to deliver a control signal corresponding to a pseudo-noise signal defined by a predetermined phase function. The interferometer assembly comprises an evaluation unit which is coupled to the interferometric photodetector assembly to detect the detector signals of same and to determine the presence and/or movement of particles and/or objects from the detector signals wherein, in the case of two wavelengths emitted from the laser light generating components, the detector signals are detected separately in two wavelength regions, and the phase function has a predetermined step-like time course and the evaluation unit scans the detector (Continued)

signals in synchrony with the timing of the steps of the phase function.

24 Claims, 1 Drawing Sheet

(51) Int. Cl.
  *G01S 7/481* (2006.01)
  *G01S 7/4912* (2020.01)
  *G01S 7/493* (2006.01)
  *G01S 17/32* (2020.01)

(52) U.S. Cl.
  CPC .............. *G01S 17/32* (2013.01); *G01S 17/95* (2013.01); *Y02A 90/10* (2018.01)

(56) References Cited

U.S. PATENT DOCUMENTS

| | | | | |
|---|---|---|---|---|
| 6,633,596 | B1 * | 10/2003 | Wulfmeyer | H01S 3/1394 372/26 |
| 8,891,069 | B2 * | 11/2014 | Pedersen | G01S 7/4811 356/28 |
| 9,702,975 | B2 | 7/2017 | Brinkmeyer et al. | |
| 9,709,491 | B1 * | 7/2017 | Murphy | G01J 3/0291 |
| 2009/0231583 | A1 * | 9/2009 | Smith | G01J 4/04 356/367 |
| 2015/0301178 | A1 * | 10/2015 | Brinkmeyer | G01S 7/4818 250/227.23 |
| 2016/0084945 | A1 * | 3/2016 | Rodrigo | G01S 17/58 356/5.01 |
| 2018/0017679 | A1 * | 1/2018 | Valouch | A63F 13/213 |

FOREIGN PATENT DOCUMENTS

| | | | |
|---|---|---|---|
| EP | 1 055 941 A2 | 11/2000 | |
| EP | 1055941 A2 * | 11/2000 | ............ G01S 17/58 |
| EP | 2 730 947 A1 | 5/2014 | |
| WO | WO 2015/114253 A1 | 12/2005 | |
| WO | WO 2014/072514 A1 | 5/2014 | |
| WO | WO-2014072514 A1 * | 5/2014 | ............ G01S 17/58 |

OTHER PUBLICATIONS

Anonymous: "Optoplex 90-Degree Optical Hybrid QPSK Demodulator," XP055281122, Jun. 18, 2009, 2 pages.
Brinkmeyer, Ernst, "CW Lidar for wind sensing featuring numerical range scanning and strong inherent suppression of disturbing reflections," *Optomechatronic Micro/Nano Devices and Components III, Proceedings of SPIE*, vol. 9645, Oct. 20, 2015, 5 pages.
Brinkmeyer, Ernst et al., "Continuous wave synthetic low-coherence wind sensing Lidar: motionless measurement system with subsequent numerical range scanning," *Optics Express*, vol. 21, No. 2, Jan. 28, 2013 (pp. 1872-1897).
Brinkeyer, Ernst, et al., "Remote Wind Sending, Can CW-Lidars Outperform Pulsed Systems?," *Lidar News Magazine*, vol. 4, No. 4, 2014, 4 pgs.
Brinkmeyer, Ernst, et al., "Fiber optic CW Doppler Lidar using a synthetic broadband source," *Lidar Technologies, Techniques, and Measurements for Atmospheric Remote Sensing IX, Proc. of SPIE*, vol. 8894, 2013, 11 pgs.
Waterholter, Thomas, et al., "Reduction of Spurious Reflections in OLCR Lidar," *Optical Society of America*, CLEO Conference on Lasers and Electro-Optics (paper CTu1 H.6) (2013), 2 pgs.
Weitkamp, C., "Doppler Wind Lidar," *Lidar—Range-resolved optical remove sensing of the atmosphere*, Springer, 2005, 49 pgs.
Zadoff-Chu-Folge, *Wikipedia* (2 pgs.).

* cited by examiner

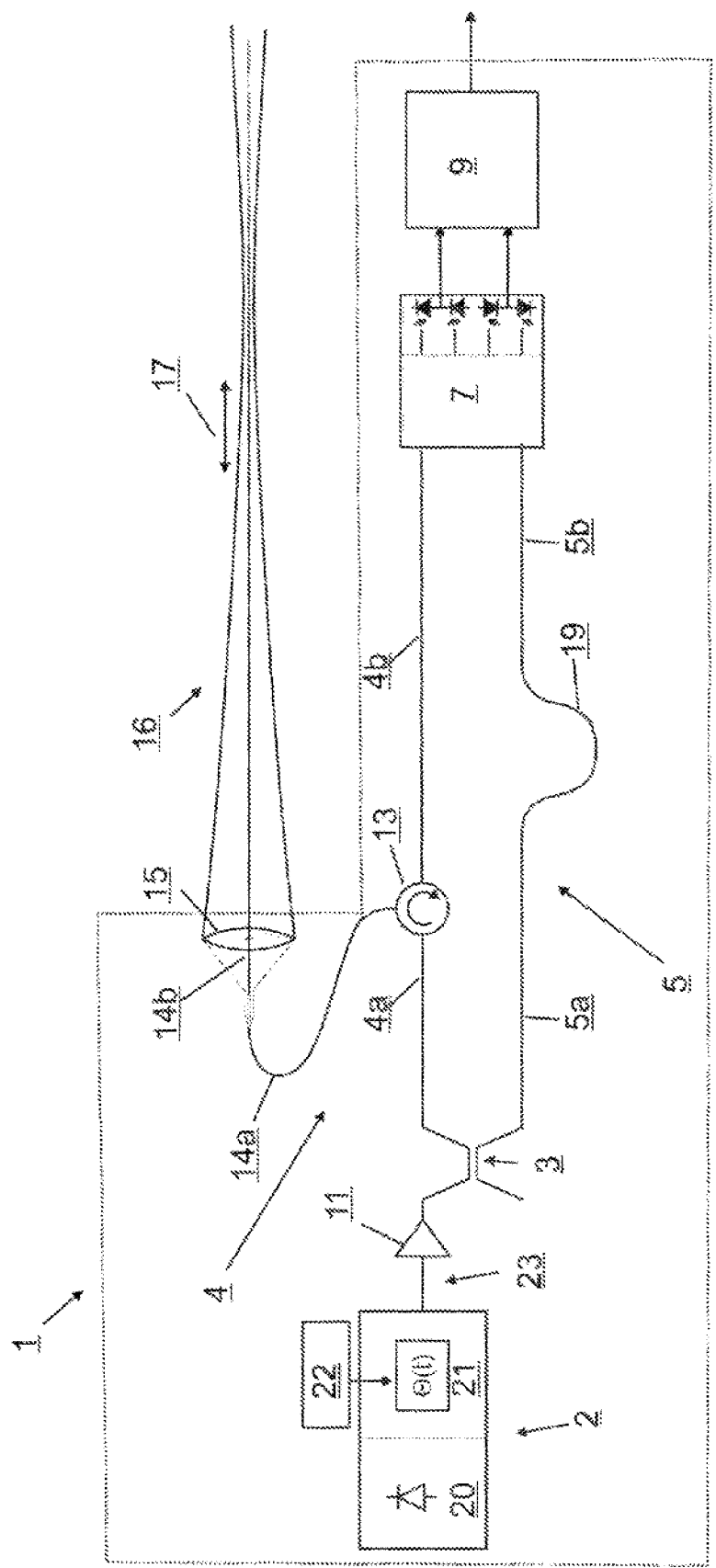

STRAY-LIGHT TOLERANT LIDAR MEASUREMENT SYSTEM AND STRAY-LIGHT TOLERANT LIDAR MEASUREMENT METHOD

RELATED APPLICATIONS

The present application is a National Phase entry of PCT Application No. PCT/DE2016/100110, filed Mar. 11, 2016, which claims priority to German Patent Application No. 10 2015 004 272.6, filed Apr. 7, 2015, the disclosures of which are hereby incorporated by reference herein in their entirety.

FIELD OF THE INVENTION

The present invention relates to a stray light-tolerant lidar measurement system for detecting the presence and/or movement of particles and/or objects in a spatial region that is remote from the lidar measurement system, and a method for detecting the presence and/or movement of particles and/or objects in a remote spatial region, using such a lidar measurement system.

BACKGROUND OF THE INVENTION

Lidar (light detection and ranging) is a method that is closely related to radar, and utilizes laser light instead of the radio waves used in the case of radar. Lidar may be used to make a remote measurement of various atmospheric parameters, and in particular to determine, from a distance, the presence, the distance, and the speed of particles and other objects in the air or in some other atmosphere. In principle, all particles that scatter the light used, and all objects that represent a reflective point of interference in space or a scattering body, may be measured.

Lidar thus takes into account the need, which exists in various fields of technology, for determining physical parameters at locations remote from the actual measuring device as a function of time in a spatially resolved, wireless, and non-invasive manner. For example, by measuring particles that are moved by wind, it is possible by use of lidar to determine the prevailing wind speed at a location remote from the measuring device. This may be utilized, for example, to easily measure the wind speed at a distance of up to several hundred meters from a wind power plant, and based on the measured wind speed, to adapt control parameters of the wind power plant in such a way that preferably optimal efficiency is achieved, and at the same time the load on the wind power plant due to the wind is kept as low as possible, and in the event of extreme wind gusts, to initiate timely emergency measures as necessary, such as emergency shutdown, to prevent damage to the wind power plant.

Known lidar systems for determining wind speeds are based on the detection of the Doppler frequency shift of the scattered light due to the scattering of laser light on particles that are moved by the wind (see, for example, C. Weitkamp, Lidar—Range-resolved optical remote sensing of the atmosphere, Springer 2005). For this reason, it is possible in each case to directly determine only the wind speed in the line of sight of the laser beam used.

In most cases, the Doppler frequency shift is determined interferometrically by superimposing the scattered light received at a measuring device with direct light of the laser source used. For this purpose, in the prior art highly coherent laser sources having coherence lengths of several hundred meters, corresponding to optical source bandwidths in the sub-MHz range, are used. Basically two different procedures are known in the prior art for achieving spatial resolution.

According to one procedure, pulsed laser sources are used, the position finding taking place via measurement of the propagation time of the laser pulses. In this way, multiple resolution elements at a distance between 0 and 300 m, for example, from the measurement system may be sampled in succession by using a pulse, whose pulse width determines the spatial resolution, and which for pulses having a width of 200 ns, for example, is approximately 30 m. These resolution elements are in each case subsections of the spatial region of interest through which the laser pulses pass.

However, moderate to poor signal-to-noise ratios routinely result due to the illumination of each resolution element by the pulse, which takes place in each case for only a brief time, and the frequency resolution, and thus also the wind speed resolution, are limited due to the short pulse widths. In addition, it is generally necessary to use relatively complicated laser systems having a master oscillator and a power amplifier.

According to the other procedure, continuous-wave laser sources are used, whose beam is focused on the particular desired target distance, using a suitable optical system such as a lens or a telescope (see, for example, WO 2005/114253 A1). With suitable focusing, in principle the majority of the received scattered light then originates from the near-focus area, so that different subsections of a spatial region of interest may be examined at different distances by shifting the focus area.

However, there is the basic problem that the effective focus length increases approximately quadratically with the distance from the optical system used for the focusing, so that for long distances, only poor spatial resolution is achievable. In addition, in each case scattered light from particles outside the focus area is also received. When such particles have a larger scattering cross section than the particles in the focus area, or are present in a much higher concentration than the particles in the focus area, their scattered light may form the majority of the received scattered light and may make the signal from the focus area unidentifiable. Without extensive measures, the measured wind speed would be associated with an incorrect location. One example is dense cloud cover that may possibly be far behind the target area, i.e., the focus area. Lastly, it is disadvantageous that the change in the focusing, which generally takes place mechanically, requires an additional equipment outlay and takes a significant amount of time.

In unexamined patent application WO 2014/072514 A1 and in the publications

E. Brinkmeyer and Th. Waterholter, Continuous wave synthetic low-coherence wind sensing Lidar: motionless measurement system with subsequent numerical range scanning, Optics Express 21, pp. 1872-1897 (2013)

E. Brinkmeyer and Th. Waterholter, Remote wind sensing, Lidar News Magazine, Vol. 4, No. 4, pp. 58-62 (2014)

E. Brinkmeyer and Th. Waterholter, Fiber optic CW Doppler Lidar using a synthetic broadband source, Proc. of SPIE, Vol. 8894, 889402 (2013), lidar measurement systems and lidar measurement methods are disclosed with which the presence and/or movement of particles in an extended remote spatial region may be determined quickly, flexibly, and with high spatial resolution, and the above-mentioned disadvantages may be avoided. A synthetic laser source is hereby used that is formed from a narrowband laser light generation component, such as a narrowband laser diode, and an optical phase modulator that is controlled with predetermined signals. In addition to avoiding disadvantages, WO 2014/072514 A1 provides the finding and the advantage that a measurement already contains the information about the particles or objects along the line of sight, in particular their speeds, and that this information may be ascertained by numerical processing of the measured data, as set forth in the cited patent document. The findings and procedures in WO 2014/072514 A1 are the basis and the starting point for the present invention.

SUMMARY OF THE INVENTION

The same as in WO 2014/072514 A1, the object of the present invention is likewise to provide a lidar measurement system having a simple design and a lidar measurement method that is easily carried out, with which the presence and/or the movement of particles or objects in an extended remote spatial region may be determined quickly, flexibly, and with a selectable spatial resolution. In contrast to WO 2014/072514 A1, here the object according to the invention is to achieve low-noise reception, in particular essentially quantum noise-limited reception, of the desired useful signals, even in the presence of comparatively strong spurious reflections and/or interfering scattering and/or interfering cross-coupling from the measurement system itself or from the immediate vicinity of the measurement system.

The stated object of suppressing spurious reflections and interfering cross-couplings has already been addressed in the publication Waterholter, T. and Brinkmeyer, E., "Reduction of spurious reflections in OLCR lidar," CLEO Conference on Lasers and Electro-Optics" (paper CTu1 H.6) (2013).

The interferences discussed therein originate, for example, from undesirable cross-couplings within the optical circulators used, from reflections from end faces of optical fibers, and from residual reflections on lens systems. However, the procedure described therein for numerical suppression of interference is not adequate, since for multiple interferences, each suppression described leaves behind residual signals when other interferences are intentionally suppressed. In addition, the described suppression method is focused only on discrete interference points, and does not function satisfactorily when the interference signals, arising in distributed form due to Rayleigh scattering in the fiber segment between the circulator and the transmitting-receiving lens/telescope, are to be suppressed. Efficient suppression of the effect of interferences of the stated type is therefore of tremendous importance, since the optical power of the interference signals at the optical detectors may be many orders of magnitude greater than that of the useful signals from the remote spatial region that are to be detected, and these interferences in the measurement system are unavoidable, even with an extremely high level of effort. For example, for a transmission power of 1 W, the power of the aforementioned interference signals is typically 1 µW in each case in good systems, while the useful signals to be received from the remote spatial region may have power in the range of 1 pW and less. Thus, without effective suppression of the effects of interference signals from the measurement system and its immediate vicinity, evaluation of the useful signals is not possible in many cases.

The stated object is achieved by a lidar measurement system having the features of the claims. Advantageous embodiments of the lidar measurement system and of the method are the subject matter of the claims.

According to the present invention, it is provided that a lidar measurement system for detecting the presence and/or movement of particles and/or objects in a spatial region that is remote from the lidar measurement system comprises an interferometer assembly having a continuous-wave laser source, a photoreceiver unit, various optical components for guiding light of the continuous-wave laser source along predetermined optical paths, and an evaluation unit.

The photoreceiver unit is adapted for outputting detector signals that are characteristic of light, originating from the continuous-wave laser source, that is incident on the photoreceiver unit. The photoreceiver unit may have one or more photodetectors.

The optical components are adapted and situated in such a way that light emitted by the continuous-wave laser source during operation is initially split, subsequently guided along a first optical path that forms a measuring branch or signal branch of the interferometer assembly, and along a second optical path, separate from the first optical path, that forms a reference branch of the interferometer assembly, and lastly, after passing through the measuring branch and the reference branch, is incident on the photoreceiver unit. The interferometer assembly thus has the design of a two-beam interferometer, similar to a Mach-Zehnder interferometer.

The reference branch has a predetermined optical path length, so that the optical propagation time $\tau_{ref}$ in the reference branch is selected in such a way that it corresponds preferably exactly to the optical propagation time $\tau_{interference,m}$ of a relevant light path in the measuring branch that is undesirable due to cross-coupling or residual reflection or scattering, or is adapted to an average optical propagation time of the undesirable light paths and to the measuring branch in such a way that the various relevant propagation times $\tau_{interference,m}$ differ preferably very little from one another. Interferences which, without suppression, prevent essentially quantum-limited detection of the useful signals from the remote spatial region are regarded as relevant. The reason for the aforementioned selection of the propagation times $\tau_{ref}$ and $\tau_{interference,m}$ is the finding that, in conjunction with the specific step-shaped phase modulation, discussed below, and the synchronous sampling of the detector signals, likewise discussed below, the aforementioned optical interference signals in systems without optical frequency shifters in the measuring branch or reference branch may thus result in direct electrical signals and may be easily suppressed. In systems having optical frequency shifters, the interference signals correspondingly deliver a narrowband electrical signal at the shift frequency, which likewise may be easily suppressed.

The measuring branch has a measuring section, in which the light is directed from the measurement system toward a spatial region that is remote from the measuring branch, and passes through same, at least partially, and light that is backscattered or reflected from particles or objects, present in the measuring section, in the direction of the measurement system is once again received at the measurement system.

In other words, a portion of the optical path of the measuring branch, namely, the measuring section, is formed by the area surrounding the measurement system, and from which photons that pass from the measurement system in the direction of the remote spatial region until they are scattered on a particle or reflected from an object return to the measurement system, where they are coupled into the remainder of the measuring branch. This requires, on the one hand, that at the beginning of the measuring section, the laser light passing through the measuring branch is emitted in the direction of the remote spatial region by means of a suitable device, and on the other hand, at the end of the measuring section a portion of the scattered light is received via a suitable reception device and subsequently guided along the remainder of the measuring branch. For each photon, the optical path length of the measuring branch is thus determined by the distance of the particles or objects, from which the scattered or reflected light that reaches the photoreceiver unit originates, from the measurement system.

It is apparent from the above discussion that the remote spatial region forms a part of the measuring section, and in the extreme case may be identical to the measuring section. The measuring section includes the area surrounding the measurement system, from which light that is scattered by particles or reflected from objects is coupled into the remainder of the measuring branch. In contrast, the remote spatial region is the area of interest for the detection, which may be selected to be smaller than, or at most equal to, the measuring section.

The evaluation unit is coupled to the photoreceiver unit and adapted for receiving its detector signals, and for determining the presence and/or movement of particles and/or objects in the remote spatial region, based on the detector signals. The latter may take place, for example, in particular in the same way as is known from the prior art. In particular, the movement and thus the speed may be determined in a known manner by ascertaining the Doppler shift of the detected light.

The continuous-wave laser source is designed in such a way that it has a coherence length in the range of 0.1 to 100 m. Since coherent interference within the photoreceiver unit is possible only for light scattered from particles or light reflected from objects, for which the optical path length of the measuring branch within the coherence length is consistent with the optical path length of the reference branch, a high spatial resolution which is selectable by a suitable choice of the coherence length is achieved due to the greatly limited coherence length. In comparison, scattered light or reflected light reaching the detector assembly from particles or objects outside this coherence domain results in a broadband detector signal. The above-mentioned spurious reflections/interfering scatterings/interfering cross-couplings in the measuring branch are present in the reference branch in the coherence domain or in its vicinity, depending on the above-mentioned selection of the optical propagation time. In contrast, the useful signals from the remote spatial region are outside the coherence domain.

The same as in WO 2014/072514 A1 and as described in detail therein, the continuous-wave laser source used in the present invention is made up of a laser light-generating component, a downstream optical phase modulator, and a control unit for controlling the optical phase modulator. The control of the phase modulator takes place based on a predetermined time-discrete data set. This data set $\Theta_n$ has the property, as described in WO 2014/072514 A1 and in greater detail in E. Brinkmeyer and Th. Waterholter, Continuous wave synthetic low-coherence wind sensing Lidar: Motionless measurement system with subsequent numerical range scanning, Optics Express 21, pp. 1872-1897 (2013), that the square of the absolute value of the discrete Fourier transform of $\exp(j\,\Theta_n)$ provides a spectral power density spectrum that has an essentially predefined shape, for example a Gaussian shape, and a predefined bandwidth. After appropriate phase modulation, the optical power density spectrum effectively has this shape and width.

For controlling the phase modulator, the aforementioned digital data must be converted into an analog control signal. According to the underlying finding of the present invention, this conversion in conjunction with the above-mentioned selection of the optical path length in the reference branch is crucial for the suppression of the stated spurious reflections/interfering scatterings/interfering cross-couplings in the measuring branch. According to the invention, the analog control signal is to be designed in such a way that the optical phase shift forms an essentially step-shaped function, the function values on the steps corresponding to the digital data set $\Theta_n$. According to the invention, the steps are preferably flat; i.e., the phase differences on a step are preferably small. The widths of the steps are preferably equal, for example 5 ns or 10 ns, and conform to the sampling theorem.

According to the invention, the evaluation unit downstream from the photoreceiver unit is adapted in such a way that the detector signals are sampled synchronously with the stepped control of the phase modulator, and the sampling times $t_{sample}$ are selected in such a way that the analog values $\Theta(t_{sample}-\tau_{ref})$ and $\Theta(t_{sample}-\tau_{interference,m})$ for the relevant spurious reflections/interfering scatterings/interfering cross-couplings lie on the same step of the step-shaped phase function, and are thus approximately equal, and their differences essentially disappear. In a system without frequency shifters in the measuring branch or reference branch, the result in particular is that the aforementioned interferences in the detector signals essentially result in direct signals, and may be easily eliminated.

In addition, the evaluation unit is adapted as in WO 2014/072514 A1 in order to make the evaluation based on a function of the detector signals, the predetermined phase function, and a time shift value $\Delta t_{shift}$, the function being selected in such a way that the result of the function—in the case of the present invention, up to the suppressed portion of the spurious reflections/interfering scatterings/interfering cross-couplings—corresponds to the detector signal that would result if a reference branch were selected that had a propagation time that was changed by $\Delta t_{shift}$ with respect to the actual reference branch, and thus also had a correspondingly changed optical path length.

The effective coherence domain here is thus numerically shifted from the location of the interferences in the measurement system toward a desired location in the remote spatial region that is determined by $\Delta t_{shift}$. This embodiment is based on the finding from WO 2014/072514 A1 that the detector signals already contain the information concerning particles and objects in other subsections of the remote spatial region, at other distances from the measurement system, and this information may be ascertained based on the numerical knowledge of the predetermined phase values $\Theta_n$. For numerically shifting the coherence domain and the evaluation of the entire remote spatial region or a fairly large subsection thereof, to be performed sequentially or in parallel in the same manner, it is necessary to know the phase function $\Theta(t)$ used for controlling the optical phase modulator and for correspondingly generating the light emitted by the continuous-wave laser source. For a natural laser source, this phase function is not known, and would have to be determined with great effort. In contrast, for the continuous-wave laser source used here, the phase properties of the laser beam are synthetically generated, are only pseudorandom, and are numerically present in the form of the phase function $\Theta(t)$. This phase function $\Theta(t)$ is found once again in a specific manner in the complex amplitudes of the detector signals, which, as described in WO 2014/072514 A1 and the other cited publications by the present inventor, may be numerically changed in a targeted manner based on the knowledge of the phase function $\Theta(t)$, in order to simulate, for purposes of the evaluation, an optical path length of the reference branch that differs from the actual optical path length.

In one preferred embodiment of the present invention, the optical components include a beam splitter, for example a fiber-optic coupler in particular, for splitting the light that is emitted by the continuous-wave laser source, polarization-maintaining optical fibers (so-called PM-fibers) or non-polarization-maintaining fibers that define at least a portion of the reference branch, and/or those optical fibers that define a portion of the measuring branch, an optical amplifier, for example an erbium fiber amplifier, in the measuring branch or upstream from the splitting in the measuring branch and the reference branch, and a coherent optical receiver with or without polarization diversity, which preferably contains one or two optical 90° hybrids.

In one preferred embodiment, the optical components, as in WO 2014/072514 A1, include an irradiation and reception device that defines the beginning and the end of the measuring section of the measuring branch, and is adapted for emitting the light away from the measurement system toward the spatial region, and for once again receiving backscattered light so that it is guided along the remainder of the measuring branch. The irradiation and reception device may have a receiver that is physically separate from an irradiation device (i.e., a bistatic system), or a component which at a location is adapted for irradiating as well as receiving laser light (i.e., a monostatic system). The combined irradiation and reception device may in particular have an optical circulator and a lens system.

In one preferred embodiment of the present invention, the photoreceiver contains an optical 6-port 90° hybrid and four photoreceivers at the outputs, two of which contain the so-called in-phase signal and two of which contain the so-called quadrature signal. Such a photoreceiver is also referred to as a coherent receiver with phase diversity. The photoreceivers may advantageously have a high-pass characteristic with a low limiting frequency of 100 kHz, for example. Within the scope of so-called balanced reception, the two in-phase signals and also the two quadrature signals are advantageously subtracted one from the other in a known manner for purposes of interference reduction.

In another preferred embodiment of the present invention, the photoreceiver for the measuring branch and/or for the reference branch has polarization beam splitter assemblies at the input, which disaggregate the particular optical waves into two mutually orthogonal polarized, for example x- and y-polarized, portions, and for each of the two polarization states has a separate coherent receiver with phase diversity. In this embodiment, the polarized partial waves from the measuring branch may be analyzed separately, or an overall signal which in terms of power is independent of polarization may be formed in the evaluation unit.

Furthermore, preferred embodiments of the present invention have, in contrast to WO 2014/072514 A1, a measuring branch with or without optical frequency shifters, in which the propagation times $\tau_{interference,m}$ of the undesirable optical paths that arise due to spurious reflections/interfering scatterings/interfering cross-couplings differ preferably very little from one another a reference branch with or without optical frequency shifters, in which the optical propagation time $\tau_{ref}$ is selected as described above with respect to the location of the spurious reflections/interfering scattering/interfering cross-coupling the above-mentioned step-shaped selection of the optical phase shift the above-mentioned selection of the receiver device with one or two optical 90° hybrids sampling of the detector signals which is synchronized with the step-shaped optical phase curve and a selection of the sampling times as described above and, the same as in WO 2014/072514 A1, the evaluation unit is adapted for making the evaluation based on a function of the detector signals, the predetermined phase function, and a time shift value $\Delta t_{shift}$, and the laser light-generating component is adapted for emitting one wavelength, or for irradiating laser light of two wavelengths simultaneously or in alternation, in order to implement a differential absorption lidar (DIAL) system or the evaluation unit is adapted for making the evaluation based on a function of the detector signals, the predetermined phase function, and a time shift value $\Delta t_{shift}$, and an optical waveguide defines at least a portion of the measuring section, and reflection devices are situated in this waveguide, so that a distributed waveguide sensor, in particular a fiber-optic sensor as described in WO 2014/072514 A1, is formed in which the reflection devices situated along the optical waveguide represent individual sensor elements or the evaluation unit is adapted for making the evaluation based on a function of the detector signals, the predetermined phase function, and a time shift value $\Delta t_{shift}$, and an optical waveguide defines at least a portion of the measuring section, and the Rayleigh backscattering from the longitudinal elements of the waveguide is evaluated in order to draw conclusions on this basis regarding the location-dependent attenuation, localized defective points, or location-dependent polarization properties.

In one advantageous embodiment of the method in which one of the lidar measurement systems described above is used, the measuring branch is adapted in such a way that the optical propagation times $\tau_{interference,m}$ of the relevant, undesirable light paths in the measuring branch that arise due to cross-coupling or residual reflection or interfering scattering preferably differ very little from the branch point of the measuring branch and the reference branch to the receiver device.

In one advantageous embodiment of the method in which one of the lidar measurement systems described above is used, the reference branch is adapted in such a way that the optical propagation time $\tau_{ref}$ from the branch point of the measuring branch and the reference branch to the receiver device preferably exactly matches that of the above-mentioned optical propagation times $\tau_{interference,m}$, which due to cross-coupling or residual reflection or interfering scattering generates the largest interference signal, or matches an average value of the relevant propagation times $\tau_{interference,m}$.

In one advantageous embodiment of the method in which one of the lidar measurement systems described above is used, the control of the phase modulator is adapted in such a way that it is controlled with a step-shaped signal, so that the optical phase values on the individual steps are preferably constant.

In one advantageous embodiment of the method in which one of the lidar measurement systems described above is used, the evaluation unit is adapted in such a way that it sets the sampling times $t_{sample}$ of the detector signals in synchronization with the step-shaped control of the optical phase modulator in such a way that the analog values $\Theta(t_{sample}-\tau_{ref})$ and $\Theta(t_{sample}-\tau_{interference,m})$ for the greatest spurious reflections/interfering scatterings/interfering cross-couplings lie on the same step of the step-shaped phase function.

In one advantageous embodiment of the method in which one of the lidar measurement systems described above is used, and an evaluation unit is adapted for making the evaluation based on a function of the detector signals, the predetermined phase function, and a time shift value $\Delta t_{shift}$, the time interval $\Delta t_{shift}$ is changed at the evaluation unit in order to numerically shift the effective coherence domain from the location of the interferences in the measurement system toward a desired location in the remote spatial region, so that the evaluation unit may determine and quantify the presence and/or movement of particles and/or objects in this subsection.

In one advantageous embodiment of the method in which one of the lidar measurement systems described above is used, and detection with polarization diversity is used in the evaluation unit, the light from two different polarization directions is detected, and by use of the evaluation unit, based on the two partial detector signals, changes in the polarization state due to the detected particles and/or objects are determined, and information is obtained therefrom concerning the type and/or shape of the particles and/or objects, or an overall power signal that is independent of polarization is formed.

In one advantageous embodiment of the method in which one of the lidar measurement systems described above is used, the light of two different wavelength ranges is detected, and by use of the evaluation unit, based on a function of the partial detector signals in both wavelength ranges, the predetermined phase function, and a plurality of different time shift values $\Delta t_{shift}$, each of which corresponds to a different subsection of the remote spatial region, the concentration of at least one gas, which for the two wavelength ranges has different absorption coefficients, is determined with spatial resolution.

In one advantageous embodiment of the method using one of the lidar measurement systems described above, in which an optical waveguide defines at least a portion of the measuring section, reflection devices are adapted in such a way that their reflectivity and/or their polarization properties change(s) as a function of a measured variable acting on them, or the sections of the optical waveguide respectively situated between two adjacent reflection devices are adapted in such a way that their optical path changes as a function of a measured variable acting on them. The waveguide, which defines a part of the measuring section, may contain one or more optical modulators, in particular phase modulators or frequency modulators, with the aim for static or quasistatic reflection devices to effectively appear as moving reflection devices. In any case, the measured variable is determined by use of the evaluation unit at locations corresponding to various reflection devices or various sections between reflection devices.

In one advantageous embodiment of the method using one of the lidar measurement systems described above, in which an optical waveguide defines at least a portion of the measuring section, the measured variable is an elongation of the optical waveguide, an oscillation of the optical waveguide, and/or a temperature.

In one advantageous embodiment of the method using one of the lidar measurement systems described above, in which an optical waveguide defines at least a portion of the measuring section, the reflection devices are formed by defective points or Rayleigh backscattering areas, and the optical waveguide is characterized with longitudinal resolution by use of the evaluation unit. The waveguide, which defines a part of the measuring section, may contain one or more optical modulators, in particular phase modulators or frequency modulators, with the aim for static or quasistatic Rayleigh backscattering areas to effectively appear as moving reflection devices. By use of this method, fiber segments may be examined by drawing conclusions concerning the local attenuation based on the change in the detector signal for adjacent measuring locations. This method may replace the use of time domain reflectometers.

The present invention is an extension of the invention "Lidar measurement system and lidar measurement method" disclosed in International Publication No. WO 2014/072514 A1, for the case, which is frequent in practice, that the measurement system has internal spurious reflections and/or interfering scatterings and/or interfering light cross-couplings, which far exceed, in terms of power, useful signals to be detected. The prior art cited therein also constitutes the full underlying basis of the present invention. For the sake of completeness, the fundamentals described in WO 2014/072514 A1 are repeated in large part within the scope of the description of the present invention. In some cases they are expressed verbatim, since the inventor of the present invention is also the lead inventor for WO 2014/072514 A1. Likewise, the inventive content of WO 2014/072514 A1 is considered to be previously known, and is sometimes expressed verbatim in the present invention. In addition, the nomenclature of WO 2014/072514 A1 has been adopted.

BRIEF DESCRIPTION OF THE DRAWINGS

The invention is explained in greater detail below based on one exemplary embodiment, with reference to the appended drawing:

FIG. 1 shows a schematic illustration of a lidar measurement system according to one exemplary embodiment of the invention.

DETAILED DESCRIPTION

The lidar measurement system schematically shown in FIG. 1 has a continuous-wave laser source (2) with an output power of 1 mW, for example, and a wavelength of 1530 nm, for example; the light of the lidar measurement system passes through an erbium fiber amplifier (11) having an output power of 1 W, for example, and is then split by a beam splitter (3) in the form of an asymmetrical fiber-optic coupler into a partially fiber-optically defined measuring branch (4) and a completely fiber-optically defined reference branch (5). The splitting by the coupler (3) takes place, for example, at a 1000:1 ratio; i.e., for example 0.1 percent of the output light intensity of the amplifier (11) is coupled into the reference branch. Alternatively, the fiber amplifier (11) may also be situated in the measuring branch (4), in which case the splitting ratio of the coupler (3) may be 1:1, for example. The optical fibers used are preferably monomode fibers with low attenuation and a field radius of 5 μm, for example. At the end of the measuring branch (4), i.e., on the end of the partial measuring branch (4b), and at the end of the reference branch (5) a coherent optical receiver (7) is situated which contains an optical 6-port 90° hybrid and four photodetectors, for example InGaAs photodiodes. As is known from coherent optical messaging systems, the receiver forms two in-phase signals and two quadrature signals, which in the receiver (7) or in the evaluation unit (9) are respectively subtracted one from the other in order to suppress balanced detection interferences. The optical detectors are preferably operated in the receiver (7) in a high-pass circuit having a low limiting frequency, for example 100 kHz, in order to filter out direct signals. The in-phase differential signal and the quadrature differential signal are subsequently supplied to an evaluation unit (9) which interprets one as the real part and the other as the imaginary part of a complex signal, and mathematically combines them into a complex signal. Lastly, this complex signal is analyzed in the evaluation unit, and is evaluated for detecting the presence and/or movement of particles and/or objects.

The optical paths in the measuring arm and the reference arm are kept preferably short, so that the polarization states at the end of the fiber segment (4b) and at the end of the reference branch (5) are set once, and are then essentially stable over time. If this is not sufficient, polarization splitters are inserted in the measuring branch and/or reference branch, or polarization-maintaining fibers are inserted in the measuring branch and/or reference branch, and/or the receiver unit (7) has suitable polarization splitters in both input paths, and for each of the two selected orthogonal polarizations, a coherent receiver having four photodetectors and the evaluation unit is supplied with four signals, from which it forms a characteristic complex signal for each polarization. The measuring branch has an optical circulator (13) by means of which light is fed over a fiber segment (14a) of a transmitting/receiving lens (15) having a focal length of 250 mm, for example. The reference branch (5) or the measuring branch (4) has a compensating fiber segment (19), so that the optical paths from the coupler (3) across the reference branch to the optical receiver unit (7) are preferably equal to the sum of the subsequent optical paths, which may result in interference signals when undesirable reflections or cross-couplings are present:

(4a) and (4b) or toward (4a), (14a), back from (14a), and (4b) or toward (4a), (14a), toward (14b), back from (14b), back from (14a), and (4b)

or a suitable intermediate value of the three aforementioned paths. Remarkably, the compensating fiber segment (19) has a different function and length than the detour path (18) in WO 2014/072514 A1, and, depending on the configuration of the design, unlike the latter-mentioned case, may be situated in the reference branch (5) and also in the measuring branch (4).

The fiber segment (14a) is preferably as short as possible, or more preferably this fiber segment is omitted altogether. As a result, the optical paths between possible points of interference at the circulator (13), at the beginning and end of the fiber segment (14a), at the transmitting/receiving lens (15), and scattering points within the fiber segment (14a) are small. If the light strikes in the area behind the lens in the manner of backscattering particles, so that it returns to the lens (15), it is re-coupled into the fiber segment (14) and subsequently into the portion (4b) of the measuring section (4) via the circulator (13). The area in which light is at all able to return to the lens (15) by backscattering on particles represents a measuring section (16) of the measuring branch (4). The presence and/or movement of particles and/or objects may be detected in the entire measuring section (16) or only in a portion thereof, which in the present patent application is referred to as the remote spatial region. Accordingly, the remote spatial region is the portion of the measuring section (16) of interest for a specific measurement. The evaluation unit (9) behind the photoreceiver unit (7) is adapted in such a way that the detector signals are sampled in synchronization with the stepped control of the phase modulator, and the sampling times $t_{sample}$ are selected in such a way that the analog values $\Theta(t_{sample}-\tau_{ref})$ and $\Theta(t_{sample}-\tau_{interference,m})$ for the relevant spurious reflections/interfering scatterings/interfering cross-couplings lie on the same step of the step-shaped phase function, and are thus approximately equal, and their differences essentially disappear. The result in particular is that the aforementioned interferences essentially result in direct signals, and may be easily eliminated. Due to the evaluation unit (9) taking into account various time shift values $\Delta t_{shift}$ in the evaluation as described above, the detection may be carried out separately, with spatial resolution, by purely mathematical means for various subsections (17) at different distances from the lens (15), without changes to the described design.

The invention claimed is:

1. A stray light-tolerant lidar measurement system for detecting the presence and/or movement of particles and/or objects in a spatial region that is remote from the lidar measurement system, using an interferometer assembly, comprising:

a continuous-wave laser source, a photoreceiver unit that is adapted for outputting detector signals that are characteristic of light from the continuous-wave laser source that is incident on the photoreceiver unit, optical components that are adapted and situated in such a way that light emitted by the continuous-wave laser source is initially split, subsequently guided along a first optical path that forms a measuring branch of the interferometer assembly, and along a second optical path, separate from the first optical path, that forms a reference branch of the interferometer assembly, and lastly, after passing through the measuring branch and the reference branch, is incident on the photoreceiver unit, wherein the reference branch has a predetermined optical path length and the measuring branch has a measuring section, in which the light is directed from the measurement system toward a spatial region that is remote from the measuring branch, and passes through same, and light that is backscattered or reflected from particles or objects, present in the spatial region, in the direction of the measurement system is once again received at the measurement system, wherein the continuous-wave laser source has a coherence length in the range of 0.1 to 100 m, and the continuous-wave laser source also has:

a laser light-generating component that is adapted for emitting laser light of one or two wavelengths, an optical phase modulator, downstream therefrom, that is adapted for receiving the laser light that is emitted by the laser light-generating component and modulating the phase of the laser light, wherein the optical phase modulator has a control signal input and is adapted for carrying out the phase modulation based on a phase function that is defined by a control signal received at the control signal input, and a control unit that is connected to the control signal input of the optical phase modulator and is adapted for delivering to the control signal input a control signal that corresponds to a pseudo-noise signal that is defined by a predetermined phase function $\Theta(t)$, wherein the control signal causes the optical phase modulator to carry out the phase modulation using the predetermined phase function $\Theta(t)$, so that the optical power density spectrum of the laser light emitted by the continuous-wave laser source has a shape and bandwidth that are determined by the phase function $\Theta(t)$, and the interferometer assembly also has an evaluation unit that is coupled to the interferometric photoreceiver unit and is adapted for receiving the detector signals of same, and based on the detector signals, determining the presence and/or movement of particles and/or objects in the remote spatial region, wherein in the case of two wavelengths that are emitted by the laser light-generating component, the detector signals are detected separately in two wavelength ranges, wherein:

the phase function $\Theta(t)$ has a predetermined step-shaped time curve, the evaluation unit samples the detector signals synchronously with the time grid of the steps of $\Theta(t)$, and the optical propagation time $\tau_{ref}$ in the reference branch is selected in such a way that it corresponds exactly to the optical propagation time $\tau_{interference,m}$ of a light path in the measuring branch of the measurement system that is undesirable due to interfering cross-coupling or residual reflection or interfering scattering on solid components and objects, or for multiple such light paths, corresponds to an average optical propagation time of the undesirable light paths, in each case measured from the splitting in the measuring branch and the reference branch to the optical combination in the receiver device.

2. The stray light-tolerant lidar measurement system according to claim 1, wherein optical fiber segments and optical paths in the measuring branch within the measurement system, which conduct light bidirectionally with respect to the receiver device, are selected to be as short as possible or are omitted altogether, so that the optical propagation times $\tau_{interference,m}$ of undesirable optical paths in the measuring branch for the photoreceiver unit that arise due to interfering cross-coupling or residual reflection or interfering scattering differ very little from one another.

3. The stray light-tolerant lidar measurement system according to claim 1, wherein in the evaluation unit the sampling times $t_{sample}$ are selected in such a way that $\Theta(t_{sample}-\tau_{ref})$ and $\Theta(t_{sample}-\tau_{interference,m})$ for the largest spurious reflections or cross-couplings lie on the same step of the step-shaped phase function, and are thus equal.

4. The stray light-tolerant lidar measurement system according to claim 1, wherein the evaluation unit is adapted for suppressing the signals generated by spurious reflections and/or interfering scatterings and/or interfering light cross-couplings, and for making the evaluation based on a function of the detector signals, the predetermined phase function, and a time shift value $\Delta t_{shift}$, wherein the function is selected in such a way that the result of the function corresponds to the detector signal for a propagation time through the reference branch that is changed by $\Delta t_{shift}$ compared to the actual propagation time through the reference branch, and the function includes multiplying the detector signal by the factor $\exp[-i(\Theta(t=\Delta t_{shift})-\Theta(t))]$.

5. The stray light-tolerant lidar measurement system according to claim 1, wherein the photoreceiver unit includes at least one optical 90° hybrid, thus forming a coherent optical receiver by means of which in-phase signals and quadrature signals may be generated.

6. The stray light-tolerant lidar measurement system according to claim 1, wherein the photoreceiver unit includes an optical 6-port 90° hybrid having two optical inputs and four optical outputs and four photodetectors for balanced optical reception of in-phase signals and quadrature signals.

7. The stray light-tolerant lidar measurement system according to claim 1, wherein the photoreceiver unit contains polarization splitter units, two optical 6-port 90° hybrids, and two sets of four photodetectors for separate detection of the measuring signals in two orthogonal polarization states, or for being able to compute from the partial signals an overall power signal that is independent of polarization.

8. The stray light-tolerant lidar measurement system according to claim 1, wherein the optical components include: a beam splitter for splitting the light that is emitted by the continuous-wave laser source, polarization-maintaining optical fibers or non-polarization-maintaining optical fibers that define at least a portion of the reference branch, and/or those optical fibers that define a portion of the measuring branch, an optical amplifier, in the measuring branch or upstream from the splitting in the measuring branch and the reference branch, wherein an optical frequency shifter may be inserted in the measuring branch or in the reference branch, and a coherent optical receiver device with or without polarization diversity, which contains a beam combiner, in particular in the form of a fiber-optic coupler, or contains one or two optical 90° hybrids.

9. The stray light-tolerant lidar measurement system according to claim 8, wherein the optical amplifier includes an erbium fiber amplifier.

10. The stray light-tolerant lidar measurement system according to claim 1, wherein the optical components include an irradiation and reception device that defines the beginning and the end of the measuring section of the measuring branch, and is adapted for emitting the light away from the measurement system toward the spatial region, and for once again receiving light backscattered in the spatial region so that it is guided along a subpath of the measuring branch.

11. The stray light-tolerant lidar measurement system according to claim 1, wherein the optical components have a unit for coupling into a waveguide, and the optical waveguide together with reflection devices contained therein defines at least a portion of the measuring section in order to analyze the waveguide itself for defective points, location-dependent attenuation, or location-dependent polarization properties, or for implementing a distributed waveguide optical sensor, in particular a fiber-optic sensor, wherein the waveguide, which defines a part of the measuring section, may contain one or more optical modulators, in particular phase modulators or frequency modulators, with the aim for static or quasistatic reflection devices or Rayleigh backscattering areas to appear as moving reflection devices.

12. A method for detecting the presence and/or movement of particles in a remote spatial region by means of a stray light-tolerant lidar measurement system according to claim 1, having the following steps:

arranging the measuring branch in such a way that the remote spatial region is part of the measuring section, setting the shape and/or bandwidth of the optical power density spectrum of the laser light that is emitted by the continuous-wave laser source, by appropriately setting the predetermined phase function $\Theta(t)$ at the control unit, operating the continuous-wave laser source in order to guide laser light simultaneously along the measuring branch and along the reference branch, and determining the presence and/or movement and/or change of particles and/or objects in the remote spatial region by means of the evaluation unit.

13. The method according to claim 12, further including the step of setting the optical phase downstream from the continuous-wave laser source to be step-shaped, using the control unit and the phase modulator.

14. The method according to claim 12, further including the step of setting the optical propagation times $\tau_{ref}$ and $\tau_{interference,m}$, wherein the optical propagation time $\tau_{ref}$ in the reference branch is selected in such a way that it corresponds exactly to the optical propagation time $\tau_{interference,m}$ of a light path in the measuring branch of the measurement system that is undesirable due to interfering cross-coupling or residual reflection or interfering scattering on solid components and objects, or for multiple such light paths, corresponds to an average optical propagation time of the undesirable light paths, in each case measured from the splitting in the measuring branch and the reference branch to the optical combination in the receiver device and wherein optical fiber segments and optical paths in the measuring branch within the measurement system, which conduct light bidirectionally with respect to the receiver device, are selected to be as short as possible or are omitted altogether, so that the optical propagation times $\tau_{interference,m}$ of undesirable optical paths in the measuring branch for the photoreceiver unit that arise due to interfering cross-coupling or residual reflection or interfering scattering differ very little from one another, and setting the sampling times of the detector signals by the evaluation unit, wherein in the evaluation unit, the sampling times $t_{sample}$ are selected in such a way that $\Theta(t_{sample}-\tau_{ref})$ and $\Theta(t_{sample}-\tau_{interference,m})$ for the largest spurious reflections or cross-couplings lie on the same step of the step-shaped phase function, and are thus equal.

15. The method according to claim 12, wherein the stray light-tolerant lidar measurement system is designed such that the evaluation unit is adapted for suppressing the signals generated by spurious reflections and/or interfering scatterings and/or interfering light cross-couplings, and for making the evaluation based on a function of the detector signals, the predetermined phase function, and a time shift value $\Delta t_{shift}$, wherein the function is selected in such a way that the result of the function corresponds to the detector signal for a propagation time through the reference branch that is changed by $\Delta t_{shift}$ compared to the actual propagation time through the reference branch, and the function includes multiplying the detector signal by the factor exp [−i $(\Theta(t-\Delta t_{shift})-\Theta(t))$], and includes the further step of changing the time interval $\Delta t_{shift}$ at the evaluation unit in order to alter the distance of a subsection of the spatial region from the lidar measurement system, wherein the subsection contains the particles whose backscattered light contributes to the interference during the coherent superimposition of the light that is guided along the measuring branch and the light that is guided along the reference branch.

16. The method according to claim 12, wherein the optical components have a unit for coupling into a waveguide, and the optical waveguide together with reflection devices contained therein defines at least a portion of the measuring section in order to analyze the waveguide itself for defective points, location-dependent attenuation, or location-dependent polarization properties, or for implementing a distributed waveguide optical sensor, in particular a fiber-optic sensor, wherein the waveguide, which defines a part of the measuring section, may contain one or more optical modulators, in particular phase modulators or frequency modulators, with the aim for static or quasistatic reflection devices or Rayleigh backscattering areas to appear as moving reflection devices, and the reflection devices are adapted in such a way that their reflectivity and/or their polarization properties change as a function of a measured variable acting on them, or the sections of the optical waveguide respectively situated between two adjacent reflection devices are adapted in such a way that their optical path changes as a function of a measured variable acting on them, wherein the measured variable is an elongation of the optical waveguide, an oscillation of the optical waveguide, and/or a temperature, wherein the measured variable is determined by use of the evaluation unit at locations corresponding to various reflection devices or various sections between reflection devices, or the optical waveguide is characterized with longitudinal resolution by use of the evaluation unit.

17. A stray light-tolerant lidar measurement system for detecting the presence and/or movement of particles and/or objects in a spatial region that is remote from the lidar measurement system, using an interferometer assembly, comprising:

a continuous-wave laser source, a photoreceiver unit that is adapted for outputting detector signals that are characteristic of light from the continuous-wave laser source that is incident on the photoreceiver unit, optical components that are adapted and situated in such a way that light emitted by the continuous-wave laser source is initially split, subsequently guided along a first optical path that forms a measuring branch of the interferometer assembly, and along a second optical path, separate from the first optical path, that forms a reference branch of the interferometer assembly, and lastly, after passing through the measuring branch and the reference branch, is incident on the photoreceiver unit, wherein the reference branch has a predetermined optical path length and the measuring branch has a measuring section, in which the light is directed from the measurement system toward a spatial region that is remote from the measuring branch, and passes through same, and light that is backscattered or reflected from particles or objects, present in the spatial region, in the direction of the measurement system is once again received at the measurement system, wherein the continuous-wave laser source has a coherence length in the range of 0.1 to 100 m, and the continuous-wave laser source also has:

a laser light-generating component that is adapted for emitting laser light of one or two wavelengths, an optical phase modulator, downstream therefrom, that is adapted for receiving the laser light that is emitted by the laser light-generating component and modulating the phase of the laser light, wherein the optical phase modulator has a control signal input and is adapted for carrying out the phase modulation based on a phase function that is defined by a control signal received at the control signal input, and a control unit that is connected to the control signal input of the optical phase modulator and is adapted for delivering to the control signal input a control signal that corresponds to a pseudo-noise signal that is defined by a predetermined phase function $\Theta(t)$, wherein the control signal causes the optical phase modulator to carry out the phase modulation using the predetermined phase function Θ(t), so that the optical power density spectrum of the laser light emitted by the continuous-wave laser source has a shape and bandwidth that are determined by the phase function Θ(t), and the interferometer assembly also has an evaluation unit that is coupled to the interferometric photoreceiver unit and is adapted for receiving the detector signals of same, and based on the detector signals, determining the presence and/or movement of particles and/or objects in the remote spatial region, wherein in the case of two wavelengths that are emitted by the laser light-generating component, the detector signals are detected separately in two wavelength ranges, wherein:

the phase function Θ(t) has a predetermined step-shaped time curve, the evaluation unit samples the detector signals synchronously with the time grid of the steps of Θ(t), and optical fiber segments and optical paths in the measuring branch within the measurement system, which conduct light bidirectionally with respect to the receiver device, are selected to be as short as possible or are omitted altogether, so that the optical propagation times $\tau_{interference,m}$ of undesirable optical paths in the measuring branch for the photoreceiver unit that arise due to interfering cross-coupling or residual reflection or interfering scattering differ very little from one another.

18. A stray light-tolerant lidar measurement system for detecting the presence and/or movement of particles and/or objects in a spatial region that is remote from the lidar measurement system, using an interferometer assembly, comprising:

a continuous-wave laser source, a photoreceiver unit that is adapted for outputting detector signals that are characteristic of light from the continuous-wave laser source that is incident on the photoreceiver unit, optical components that are adapted and situated in such a way that light emitted by the continuous-wave laser source is initially split, subsequently guided along a first optical path that forms a measuring branch of the interferometer assembly, and along a second optical path, separate from the first optical path, that forms a reference branch of the interferometer assembly, and lastly, after passing through the measuring branch and the reference branch, is incident on the photoreceiver unit, wherein the reference branch has a predetermined optical path length and the measuring branch has a measuring section, in which the light is directed from the measurement system toward a spatial region that is remote from the measuring branch, and passes through same, and light that is backscattered or reflected from particles or objects, present in the spatial region, in the direction of the measurement system is once again received at the measurement system, wherein the continuous-wave laser source has a coherence length in the range of 0.1 to 100 m, and the continuous-wave laser source also has:

a laser light-generating component that is adapted for emitting laser light of one or two wavelengths, an optical phase modulator, downstream therefrom, that is adapted for receiving the laser light that is emitted by the laser light-generating component and modulating the phase of the laser light, wherein the optical phase modulator has a control signal input and is adapted for carrying out the phase modulation based on a phase function that is defined by a control signal received at the control signal input, and a control unit that is connected to the control signal input of the optical phase modulator and is adapted for delivering to the control signal input a control signal that corresponds to a pseudo-noise signal that is defined by a predetermined phase function Θ(t), wherein the control signal causes the optical phase modulator to carry out the phase modulation using the predetermined phase function Θ(t), so that the optical power density spectrum of the laser light emitted by the continuous-wave laser source has a shape and bandwidth that are determined by the phase function Θ(t), and the interferometer assembly also has an evaluation unit that is coupled to the interferometric photoreceiver unit and is adapted for receiving the detector signals of same, and based on the detector signals, determining the presence and/or movement of particles and/or objects in the remote spatial region, wherein in the case of two wavelengths that are emitted by the laser light-generating component, the detector signals are detected separately in two wavelength ranges, wherein:

the phase function Θ(t) has a predetermined step-shaped time curve, the evaluation unit samples the detector signals synchronously with the time grid of the steps of Θ(t), and in the evaluation unit the sampling times $t_{sample}$ are selected in such a way that $\Theta(t_{sample}-\tau_{ref})$ and $\Theta(t_{sample}-\tau_{interference,m})$ for the largest spurious reflections or cross-couplings lie on the same step of the step-shaped phase function, and are thus equal.

19. A stray light-tolerant lidar measurement system for detecting the presence and/or movement of particles and/or objects in a spatial region that is remote from the lidar measurement system, using an interferometer assembly, comprising:

a continuous-wave laser source, a photoreceiver unit that is adapted for outputting detector signals that are characteristic of light from the continuous-wave laser source that is incident on the photoreceiver unit, optical components that are adapted and situated in such a way that light emitted by the continuous-wave laser source is initially split, subsequently guided along a first optical path that forms a measuring branch of the interferometer assembly, and along a second optical path, separate from the first optical path, that forms a reference branch of the interferometer assembly, and lastly, after passing through the measuring branch and the reference branch, is incident on the photoreceiver unit, wherein the reference branch has a predetermined optical path length and the measuring branch has a measuring section, in which the light is directed from the measurement system toward a spatial region that is remote from the measuring branch, and passes through same, and light that is backscattered or reflected from particles or objects, present in the spatial region, in the direction of the measurement system is once again received at the measurement system, wherein the continuous-wave laser source has a coherence length in the range of 0.1 to 100 m,
and the continuous-wave laser source also has:
a laser light-generating component that is adapted for emitting laser light of one or two wavelengths,
an optical phase modulator, downstream therefrom, that is adapted for receiving the laser light that is emitted by the laser light-generating component and modulating the phase of the laser light, wherein the optical phase modulator has a control signal input and is adapted for carrying out the phase modulation based on a phase function that is defined by a control signal received at the control signal input,
and a control unit that is connected to the control signal input of the optical phase modulator and is adapted for delivering to the control signal input a control signal that corresponds to a pseudo-noise signal that is defined by a predetermined phase function $\Theta(t)$, wherein the control signal causes the optical phase modulator to carry out the phase modulation using the predetermined phase function $\Theta(t)$, so that the optical power density spectrum of the laser light emitted by the continuous-wave laser source has a shape and bandwidth that are determined by the phase function $\Theta(t)$,
and the interferometer assembly also has
an evaluation unit that is coupled to the interferometric photoreceiver unit and is adapted for receiving the detector signals of same, and based on the detector signals, determining the presence and/or movement of particles and/or objects in the remote spatial region, wherein in the case of two wavelengths that are emitted by the laser light-generating component, the detector signals are detected separately in two wavelength ranges,
wherein:
the phase function $\Theta(t)$ has a predetermined step-shaped time curve,
the evaluation unit samples the detector signals synchronously with the time grid of the steps of $\Theta(t)$, and
the photoreceiver unit includes an optical 6-port 90° hybrid having two optical inputs and four optical outputs and four photodetectors for balanced optical reception of in-phase signals and quadrature signals.

20. A stray light-tolerant lidar measurement system for detecting the presence and/or movement of particles and/or objects in a spatial region that is remote from the lidar measurement system, using an interferometer assembly, comprising:
a continuous-wave laser source,
a photoreceiver unit that is adapted for outputting detector signals that are characteristic of light from the continuous-wave laser source that is incident on the photoreceiver unit,
optical components that are adapted and situated in such a way that light emitted by the continuous-wave laser source
is initially split,
subsequently guided along a first optical path that forms a measuring branch of the interferometer assembly, and along a second optical path, separate from the first optical path, that forms a reference branch of the interferometer assembly, and
lastly, after passing through the measuring branch and the reference branch, is incident on the photoreceiver unit, wherein the reference branch has a predetermined optical path length and
the measuring branch has a measuring section, in which the light is directed from the measurement system toward a spatial region that is remote from the measuring branch, and passes through same, and light that is backscattered or reflected from particles or objects, present in the spatial region, in the direction of the measurement system is once again received at the measurement system,
wherein the continuous-wave laser source has a coherence length in the range of 0.1 to 100 m,
and the continuous-wave laser source also has:
a laser light-generating component that is adapted for emitting laser light of one or two wavelengths,
an optical phase modulator, downstream therefrom, that is adapted for receiving the laser light that is emitted by the laser light-generating component and modulating the phase of the laser light, wherein the optical phase modulator has a control signal input and is adapted for carrying out the phase modulation based on a phase function that is defined by a control signal received at the control signal input,
and a control unit that is connected to the control signal input of the optical phase modulator and is adapted for delivering to the control signal input a control signal that corresponds to a pseudo-noise signal that is defined by a predetermined phase function $\Theta(t)$, wherein the control signal causes the optical phase modulator to carry out the phase modulation using the predetermined phase function $\Theta(t)$, so that the optical power density spectrum of the laser light emitted by the continuous-wave laser source has a shape and bandwidth that are determined by the phase function $\Theta(t)$,
and the interferometer assembly also has
an evaluation unit that is coupled to the interferometric photoreceiver unit and is adapted for receiving the detector signals of same, and based on the detector signals, determining the presence and/or movement of particles and/or objects in the remote spatial region, wherein in the case of two wavelengths that are emitted by the laser light-generating component, the detector signals are detected separately in two wavelength ranges,
wherein:
the phase function $\Theta(t)$ has a predetermined step-shaped time curve,
the evaluation unit samples the detector signals synchronously with the time grid of the steps of $\Theta(t)$, and
the photoreceiver unit contains polarization splitter units, two optical 6-port 90° hybrids, and two sets of four photodetectors for separate detection of the measuring signals in two orthogonal polarization states, or for being able to compute from the partial signals an overall power signal that is independent of polarization.

21. A stray light-tolerant lidar measurement system for detecting the presence and/or movement of particles and/or objects in a spatial region that is remote from the lidar measurement system, using an interferometer assembly, comprising:
a continuous-wave laser source,
a photoreceiver unit that is adapted for outputting detector signals that are characteristic of light from the continuous-wave laser source that is incident on the photoreceiver unit,
optical components that are adapted and situated in such a way that light emitted by the continuous-wave laser source is initially split, subsequently guided along a first optical path that forms a measuring branch of the interferometer assembly, and along a second optical path, separate from the first optical path, that forms a reference branch of the interferometer assembly, and lastly, after passing through the measuring branch and the reference branch, is incident on the photoreceiver unit, wherein the reference branch has a predetermined optical path length and the measuring branch has a measuring section, in which the light is directed from the measurement system toward a spatial region that is remote from the measuring branch, and passes through same, and light that is backscattered or reflected from particles or objects, present in the spatial region, in the direction of the measurement system is once again received at the measurement system, wherein the continuous-wave laser source has a coherence length in the range of 0.1 to 100 m, and the continuous-wave laser source also has:

a laser light-generating component that is adapted for emitting laser light of one or two wavelengths, an optical phase modulator, downstream therefrom, that is adapted for receiving the laser light that is emitted by the laser light-generating component and modulating the phase of the laser light, wherein the optical phase modulator has a control signal input and is adapted for carrying out the phase modulation based on a phase function that is defined by a control signal received at the control signal input, and a control unit that is connected to the control signal input of the optical phase modulator and is adapted for delivering to the control signal input a control signal that corresponds to a pseudo-noise signal that is defined by a predetermined phase function $\Theta(t)$, wherein the control signal causes the optical phase modulator to carry out the phase modulation using the predetermined phase function $\Theta(t)$, so that the optical power density spectrum of the laser light emitted by the continuous-wave laser source has a shape and bandwidth that are determined by the phase function $\Theta(t)$, and the interferometer assembly also has an evaluation unit that is coupled to the interferometric photoreceiver unit and is adapted for receiving the detector signals of same, and based on the detector signals, determining the presence and/or movement of particles and/or objects in the remote spatial region, wherein in the case of two wavelengths that are emitted by the laser light-generating component, the detector signals are detected separately in two wavelength ranges, wherein:

the phase function $\Theta(t)$ has a predetermined step-shaped time curve, the evaluation unit samples the detector signals synchronously with the time grid of the steps of $\Theta(t)$, and the optical components have a unit for coupling into a waveguide, and the optical waveguide together with reflection devices contained therein defines at least a portion of the measuring section in order to analyze the waveguide itself for defective points, location-dependent attenuation, or location-dependent polarization properties, or for implementing a distributed waveguide optical sensor, in particular a fiber-optic sensor, wherein the waveguide, which defines a part of the measuring section, may contain one or more optical modulators, in particular phase modulators or frequency modulators, with the aim for static or quasistatic reflection devices or Rayleigh backscattering areas to appear as moving reflection devices.

22. A method for detecting the presence and/or movement of particles in a remote spatial region by means of a stray light-tolerant lidar measurement system, the system including:

a continuous-wave laser source, a photoreceiver unit that is adapted for outputting detector signals that are characteristic of light from the continuous-wave laser source that is incident on the photoreceiver unit, optical components that are adapted and situated in such a way that light emitted by the continuous-wave laser source is initially split, subsequently guided along a first optical path that forms a measuring branch of the interferometer assembly, and along a second optical path, separate from the first optical path, that forms a reference branch of the interferometer assembly, and lastly, after passing through the measuring branch and the reference branch, is incident on the photoreceiver unit, wherein the reference branch has a predetermined optical path length and the measuring branch has a measuring section, in which the light is directed from the measurement system toward a spatial region that is remote from the measuring branch, and passes through same, and light that is backscattered or reflected from particles or objects, present in the spatial region, in the direction of the measurement system is once again received at the measurement system, wherein the continuous-wave laser source has a coherence length in the range of 0.1 to 100 m, and the continuous-wave laser source also has:

a laser light-generating component that is adapted for emitting laser light of one or two wavelengths, an optical phase modulator, downstream therefrom, that is adapted for receiving the laser light that is emitted by the laser light-generating component and modulating the phase of the laser light, wherein the optical phase modulator has a control signal input and is adapted for carrying out the phase modulation based on a phase function that is defined by a control signal received at the control signal input, and a control unit that is connected to the control signal input of the optical phase modulator and is adapted for delivering to the control signal input a control signal that corresponds to a pseudo-noise signal that is defined by a predetermined phase function $\Theta(t)$, wherein the control signal causes the optical phase modulator to carry out the phase modulation using the predetermined phase function $\Theta(t)$, so that the optical power density spectrum of the laser light emitted by the continuous-wave laser source has a shape and bandwidth that are determined by the phase function $\Theta(t)$, and the interferometer assembly also has an evaluation unit that is coupled to the interferometric photoreceiver unit and is adapted for receiving the detector signals of same, and based on the detector signals, determining the presence and/or movement of particles and/or objects in the remote spatial region, wherein in the case of two wavelengths that are emitted by the laser light-generating component, the detector signals are detected separately in two wavelength ranges, wherein:

the phase function Θ(t) has a predetermined step-shaped time curve, and the evaluation unit samples the detector signals synchronously with the time grid of the steps of Θ(t), the method having the following steps:

arranging the measuring branch in such a way that the remote spatial region is part of the measuring section, setting the shape and/or bandwidth of the optical power density spectrum of the laser light that is emitted by the continuous-wave laser source, by appropriately setting the predetermined phase function Θ(t) at the control unit, operating the continuous-wave laser source in order to guide laser light simultaneously along the measuring branch and along the reference branch, determining the presence and/or movement and/or change of particles and/or objects in the remote spatial region by means of the evaluation unit, and setting the optical propagation times $\tau_{ref}$ and $\tau_{interference,m}$, wherein the optical propagation time $\tau_{ref}$ in the reference branch is selected in such a way that it corresponds exactly to the optical propagation time $\tau_{interference,m}$ of a light path in the measuring branch of the measurement system that is undesirable due to interfering cross-coupling or residual reflection or interfering scattering on solid components and objects, or for multiple such light paths, corresponds to an average optical propagation time of the undesirable light paths, in each case measured from the splitting in the measuring branch and the reference branch to the optical combination in the receiver device and wherein optical fiber segments and optical paths in the measuring branch within the measurement system, which conduct light bidirectionally with respect to the receiver device, are selected to be as short as possible or are omitted altogether, so that the optical propagation times $\tau_{interference,m}$ of undesirable optical paths in the measuring branch for the photoreceiver unit that arise due to interfering cross-coupling or residual reflection or interfering scattering differ very little from one another, and setting the sampling times of the detector signals by the evaluation unit, wherein in the evaluation unit, the sampling times $t_{sample}$ are selected in such a way that $\Theta(t_{sample}-\tau_{ref})$ and $\Theta(t_{sample}-\tau_{interference,m})$ for the largest spurious reflections or cross-couplings lie on the same step of the step-shaped phase function, and are thus equal.

23. A method for detecting the presence and/or movement of particles in a remote spatial region by means of a stray light-tolerant lidar measurement system, the system including:

a continuous-wave laser source, a photoreceiver unit that is adapted for outputting detector signals that are characteristic of light from the continuous-wave laser source that is incident on the photoreceiver unit, optical components that are adapted and situated in such a way that light emitted by the continuous-wave laser source is initially split, subsequently guided along a first optical path that forms a measuring branch of the interferometer assembly, and along a second optical path, separate from the first optical path, that forms a reference branch of the interferometer assembly, and lastly, after passing through the measuring branch and the reference branch, is incident on the photoreceiver unit, wherein the reference branch has a predetermined optical path length and the measuring branch has a measuring section, in which the light is directed from the measurement system toward a spatial region that is remote from the measuring branch, and passes through same, and light that is backscattered or reflected from particles or objects, present in the spatial region, in the direction of the measurement system is once again received at the measurement system, wherein the continuous-wave laser source has a coherence length in the range of 0.1 to 100 m, and the continuous-wave laser source also has:

a laser light-generating component that is adapted for emitting laser light of one or two wavelengths, an optical phase modulator, downstream therefrom, that is adapted for receiving the laser light that is emitted by the laser light-generating component and modulating the phase of the laser light, wherein the optical phase modulator has a control signal input and is adapted for carrying out the phase modulation based on a phase function that is defined by a control signal received at the control signal input, and a control unit that is connected to the control signal input of the optical phase modulator and is adapted for delivering to the control signal input a control signal that corresponds to a pseudo-noise signal that is defined by a predetermined phase function Θ(t), wherein the control signal causes the optical phase modulator to carry out the phase modulation using the predetermined phase function Θ(t), so that the optical power density spectrum of the laser light emitted by the continuous-wave laser source has a shape and bandwidth that are determined by the phase function Θ(t), and the interferometer assembly also has an evaluation unit that is coupled to the interferometric photoreceiver unit and is adapted for receiving the detector signals of same, and based on the detector signals, determining the presence and/or movement of particles and/or objects in the remote spatial region, wherein in the case of two wavelengths that are emitted by the laser light-generating component, the detector signals are detected separately in two wavelength ranges, wherein:

the phase function Θ(t) has a predetermined step-shaped time curve, and the evaluation unit samples the detector signals synchronously with the time grid of the steps of Θ(t), the method having the following steps:

arranging the measuring branch in such a way that the remote spatial region is part of the measuring section, setting the shape and/or bandwidth of the optical power density spectrum of the laser light that is emitted by the continuous-wave laser source, by appropriately setting the predetermined phase function Θ(t) at the control unit, operating the continuous-wave laser source in order to guide laser light simultaneously along the measuring branch and along the reference branch, determining the presence and/or movement and/or change of particles and/or objects in the remote spatial region by means of the evaluation unit, and wherein the stray light-tolerant lidar measurement system is designed such that the evaluation unit is adapted for suppressing the signals generated by spurious reflections and/or interfering scatterings and/or interfering light cross-couplings, and for making the evaluation based on a function of the detector signals, the predetermined phase function, and a time shift value $\Delta t_{shift}$, wherein the function is selected in such a way that the result of the function corresponds to the detector signal for a propagation time through the reference branch that is changed by $\Delta t_{shift}$ compared to the actual propagation time through the reference branch, and the function includes multiplying the detector signal by the factor $\exp[-i(\Theta(t=\Delta t_{shift})-\Theta(t))]$, and includes the further step of changing the time interval $\Delta t_{shift}$ at the evaluation unit in order to alter the distance of a subsection of the spatial region from the lidar measurement system, wherein the subsection contains the particles whose backscattered light contributes to the interference during the coherent superimposition of the light that is guided along the measuring branch and the light that is guided along the reference branch.

24. A method for detecting the presence and/or movement of particles in a remote spatial region by means of a stray light-tolerant lidar measurement system, the system including:

a continuous-wave laser source, a photoreceiver unit that is adapted for outputting detector signals that are characteristic of light from the continuous-wave laser source that is incident on the photoreceiver unit, optical components that are adapted and situated in such a way that light emitted by the continuous-wave laser source is initially split, subsequently guided along a first optical path that forms a measuring branch of the interferometer assembly, and along a second optical path, separate from the first optical path, that forms a reference branch of the interferometer assembly, and lastly, after passing through the measuring branch and the reference branch, is incident on the photoreceiver unit, wherein the reference branch has a predetermined optical path length and the measuring branch has a measuring section, in which the light is directed from the measurement system toward a spatial region that is remote from the measuring branch, and passes through same, and light that is backscattered or reflected from particles or objects, present in the spatial region, in the direction of the measurement system is once again received at the measurement system, wherein the continuous-wave laser source has a coherence length in the range of 0.1 to 100 m, and the continuous-wave laser source also has:

a laser light-generating component that is adapted for emitting laser light of one or two wavelengths, an optical phase modulator, downstream therefrom, that is adapted for receiving the laser light that is emitted by the laser light-generating component and modulating the phase of the laser light, wherein the optical phase modulator has a control signal input and is adapted for carrying out the phase modulation based on a phase function that is defined by a control signal received at the control signal input, and a control unit that is connected to the control signal input of the optical phase modulator and is adapted for delivering to the control signal input a control signal that corresponds to a pseudo-noise signal that is defined by a predetermined phase function $\Theta(t)$, wherein the control signal causes the optical phase modulator to carry out the phase modulation using the predetermined phase function $\Theta(t)$, so that the optical power density spectrum of the laser light emitted by the continuous-wave laser source has a shape and bandwidth that are determined by the phase function $\Theta(t)$, and the interferometer assembly also has an evaluation unit that is coupled to the interferometric photoreceiver unit and is adapted for receiving the detector signals of same, and based on the detector signals, determining the presence and/or movement of particles and/or objects in the remote spatial region, wherein in the case of two wavelengths that are emitted by the laser light-generating component, the detector signals are detected separately in two wavelength ranges, wherein:

the phase function $\Theta(t)$ has a predetermined step-shaped time curve, and the evaluation unit samples the detector signals synchronously with the time grid of the steps of $\Theta(t)$, the method having the following steps:

arranging the measuring branch in such a way that the remote spatial region is part of the measuring section, setting the shape and/or bandwidth of the optical power density spectrum of the laser light that is emitted by the continuous-wave laser source, by appropriately setting the predetermined phase function $\Theta(t)$ at the control unit, operating the continuous-wave laser source in order to guide laser light simultaneously along the measuring branch and along the reference branch, determining the presence and/or movement and/or change of particles and/or objects in the remote spatial region by means of the evaluation unit, and wherein the optical components have a unit for coupling into a waveguide, and the optical waveguide together with reflection devices contained therein defines at least a portion of the measuring section in order to analyze the waveguide itself for defective points, location-dependent attenuation, or location-dependent polarization properties, or for implementing a distributed waveguide optical sensor, in particular a fiber-optic sensor, wherein the waveguide, which defines a part of the measuring section, may contain one or more optical modulators, in particular phase modulators or frequency modulators, with the aim for static or quasistatic reflection devices or Rayleigh backscattering areas to appear as moving reflection devices, and the reflection devices are adapted in such a way that their reflectivity and/or their polarization properties change as a function of a measured variable acting on them, or the sections of the optical waveguide respectively situated between two adjacent reflection devices are adapted in such a way that their optical path changes as a function of a measured variable acting on them, wherein the measured variable is an elongation of the optical waveguide, an oscillation of the optical waveguide, and/or a temperature, wherein the measured variable is determined by use of the evaluation unit at locations corresponding to various reflection devices or various sections between reflection devices, or the optical waveguide is characterized with longitudinal resolution by use of the evaluation unit.

* * * * *